Patented July 24, 1923.

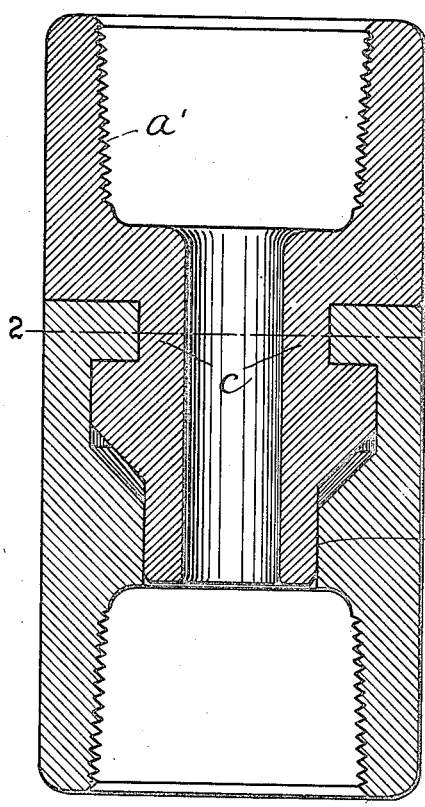
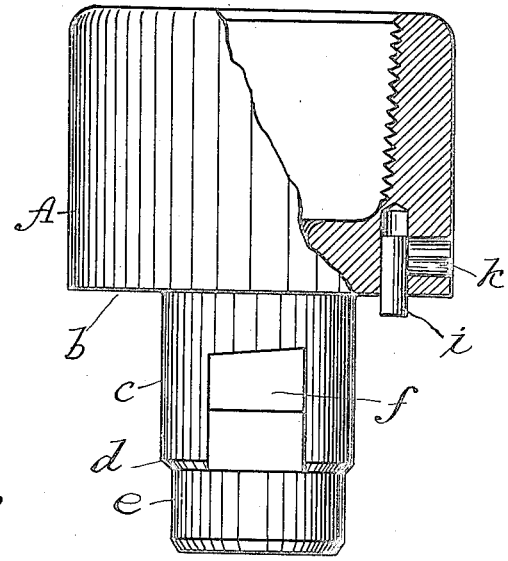
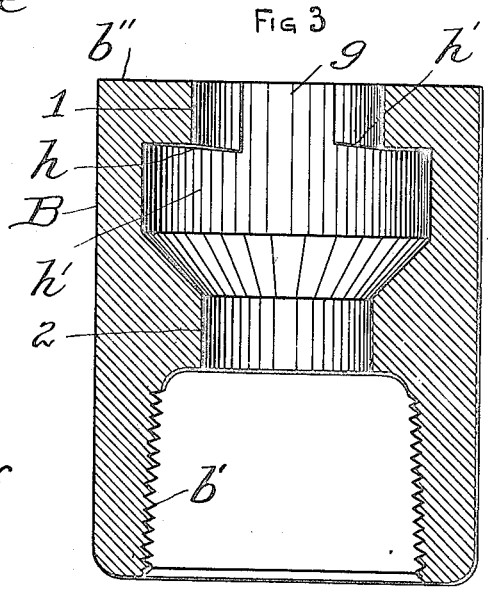
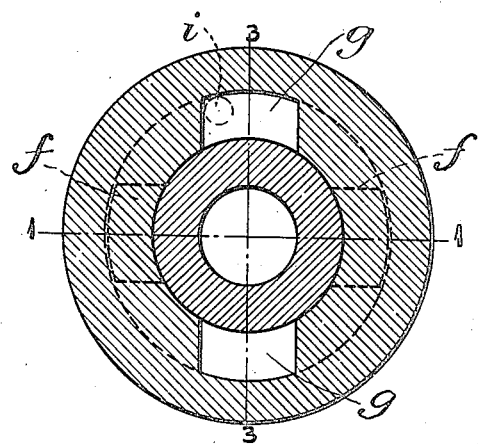

1,462,824

UNITED STATES PATENT OFFICE.

CLARENCE E. REED AND MAX CZEFTCZICK, OF HOUSTON, TEXAS; SAID CZEFTCZICK ASSIGNOR TO SAID REED.

COUPLING OR TOOL JOINT.

Application filed October 29, 1919. Serial No. 334,273.

*To all whom it may concern:*

Be it known that we, CLARENCE E. REED and MAX CZEFTCZICK, citizens of the United States of America, both of Houston, Texas, have invented certain new and useful Improvements in Couplings or Tool Joints, of which the following is a specification.

Our invention relates to means for coupling together sections of a drill stem used in oil wells to permit ready assembling or separation of the pipe or stem sections and to provide a joint whereby leakage will be prevented and one which will be reliable in use. The invention concerns also means for locking the joint when adjusted into the position predetermined upon.

The invention consists in the features and combination and arrangement of parts hereinafter described and particularly pointed out in the claims. In the accompanying drawings Figure 1 is a vertical sectional view of the coupling on the line 1—1 of Figure 2.

Figure 2 is a sectional view on the line 2—2 of Figure 1.

Figure 3 is a view of one member of the coupling partly in side elevation and partly in section on the line 3—3 of Figure 2.

Figure 4 is a sectional view of one member of the coupling on the line 1—1 of Figure 2.

The coupling comprises two members A and B. Each of these members is provided with means whereby it may be attached to the drill stem section. This means consists of the screw-threaded sockets $a'$ and $b'$. The coupling member A is turned to form a shoulder $b$ and a tubular projection made up of a portion $c$ of comparatively large diameter, a terminal portion $e$ of smaller diameter, and an intermediate portion $d$, which is of conical form, the portions $c$ and $e$ being of cylindrical form. Lugs $f$ project laterally from the tubular extension and the lower portions of these lugs are inclined to conform to the incline of the conical section $d$ while the top portions of these lugs are finished off on a helical line.

The complementary member of the coupling is provided with a bearing face or shoulder $b''$ to receive the shoulder $b$ of the member above described when the parts are connected together, and it is provided with slots or gates $g$ to receive the lugs $f$ of the member first mentioned, and also a cam-way $h$ to cooperate with the upper inclined surfaces of the lugs $f$ to draw the two coupling members together when they are in operative relation and one is turned relatively to the other, this turning action causing the lug to travel along the inclined cam-way and draw the two coupling members together so that the shoulder $b$ and the shoulder $b''$ will be in firm contact with each other. The member B is provided with two separated bearing faces 1 and 2. These faces are of cylindrical form and respectively are of diameters to correspond with the cylindrical portions $c$ and $e$ of the projection or extension of the member A. The cam-way $h$ is formed on the upper wall of a recess $h'$ formed within the member B. This recess may extend around the interior of the member B from one gate $g$ to the other or may extend only part-way around so that the lugs $f$ will come against a fixed stop, if desired. On the other hand, the lugs $f$ during the wedging action of the two parts together may pass only about one-quarter way around the circle. As before stated, the two portions $c$ and $e$ of the projection or extension of the member A are cylindrical in form and as they fit within corresponding bearing portions or surfaces of the member B, the structure prevents any lateral movement or rocking of the parts in relation to each other and holds them in axial alignment with each other and consequently with the axis of the drill stem sections. The cylindrical surfaces of the parts $c$ and $e$ will fit close to the bearing surface within the member B to prevent any lateral movement, as just stated, while closure of the coupling to prevent escape of flushing water will be maintained by the shoulders $b$ and $b''$ in firm contact with each other. While the parts will be held firmly in contact they will not stick together unduly and their separation readily can be effected.

We provide means whereby the coupling members may be locked in their final positions against retrograding or unlocking movement. For this purpose we provide a latch $i$ which consists of a pin mounted in a cavity of the upper member A and adapted to drop by gravity into an opening in the lower member when the pin is brought into registration with this opening. In carrying out this part of the invention we utilize for the opening to receive the locking pin one of the gate-ways $g$. The pin is adapted to drop by gravity into this gate-way as soon as the two coupling members have been turned to such a wedged together position that their shoulders $b$, $b''$, are in contact with each other. At this moment the locking pin will drop over the edge of the gate $g$ and, therefore, reverse movement of the coupling members will be prevented. The pin is so proportioned and is of such material as to resist any tendency to being sheared off. This pin may have a projection $k$ extending through a slot in the wall of the member A so that by means of a suitable implement inserted under this projection the pin may be raised so as to unlock the coupling members and allow them to be disconnected by rotating one in relation to the other. We do not limit ourselves to the construction of pin illustrated as the pin also may be spring-pressed, if desired, but we prefer the gravity arrangement as it affords less liability for the collection of sand which would interfere with the functioning of the spring.

The end $e$ of small diameter as compared with the diameter of the bearing surface 1 enables the member A to be quickly assembled with the member B and the bevelled shoulder $d$ serves as means of bringing the parts into axial alignment without special care on the part of the operator. The lock it will be noticed is within the outside diameter of the coupling.

We claim as our invention:

1. A coupling for hollow drill stem sections of deep well drilling apparatus, comprising a member having a socket with an inwardly extending gated flange, with inclined under surfaces and with a plain cylindric-like bearing face defining the central opening, and having also within it a second plain cylindric bearing face spaced apart from the first and of less diameter than said first mentioned cylindric bearing face, and a second member having a plain faced cylindrical projection provided with a passage for flushing fluid, one part of which projection is of a diameter to fit the larger cylindric bearing face of the first member, and the other terminal part of said cylindrical projection being of a diameter to fit within the smaller diameter cylindric bearing face of the first member, said cylindrical projection having lateral projections adapted to pass through the gates of the flange of the first mentioned member and to work against the under inclined surfaces thereof for drawing the parts together, each of the said members having a flat end face lying in a plane at right angles to the axis of the coupling and seating one against the other when the lateral projections and inclines draw the parts together, the axial thrusts being sustained solely by said end faces, substantially as described.

2. In combination, a socket member having an inwardly extending flange at its top with gate-ways, a second member having a projection with laterally extending lugs to pass through said gate-ways and to be turned under said flange, and a pin carried by the second member to drop into one of the gate-ways when the two members have assumed a certain relation to each other, substantially as described.

3. In combination in a coupling for hollow drill stem sections, a member having an interior screw thread at one end to engage a pipe section, and a socket with an overhanging flange provided with gate-ways at its other end, a second member having a projection of reduced diameter and provided with lugs to pass through said gate-ways and engage under the flange, and a screw threaded socket for attachment to a drill stem section, and a locking pin completely housed in and protected by the body of the second member and engaging one of the gate-ways, said second member having a shoulder surrounding the projection and lying in a plane at right angles to the axis of the said member and adapted to fit tightly upon a similar end face of the socketed member, said locking pin extending across the joint between said faces when the two members are locked together, substantially as described.

In testimony whereof, we affix our signatures.

CLARENCE E. REED.
MAX CZEFTCZICK.